United States Patent [19]

Harms et al.

[11] Patent Number: 5,533,783
[45] Date of Patent: Jul. 9, 1996

[54] DIVIDED SEAT FOR A MOTOR VEHICLE

[75] Inventors: Thomas Harms, Allershausen; Karl-Heinz Abe, Woerthsee, both of Germany

[73] Assignee: Bayerische Motoren Werke AG, Munich, Germany

[21] Appl. No.: 297,927

[22] Filed: Aug. 31, 1994

[30] Foreign Application Priority Data

Sep. 6, 1993 [DE] Germany ............... 43 30 120.7

[51] Int. Cl.⁶ .................................................. B62J 1/14
[52] U.S. Cl. ...................... 297/195.13; 297/188.09; 297/243; 297/440.22; 180/219
[58] Field of Search .......................... 297/188.09, 188.10, 297/195.2, 195.3, 243, 440.22; 180/219

[56] References Cited

U.S. PATENT DOCUMENTS

| 4,462,634 | 7/1984 | Hanagan ................................ 297/243 |
| 4,506,754 | 3/1985 | Hirano et al. . | |

FOREIGN PATENT DOCUMENTS

| 7725035 | 8/1977 | Germany . | |
| 3403697A | 8/1985 | Germany . | |
| 2147484 | 6/1990 | Japan ............................... 297/195.12 |
| 4331676 | 11/1992 | Japan ............................... 297/195.13 |
| 4325385 | 11/1992 | Japan ............................... 297/188.09 |

OTHER PUBLICATIONS

Patent Abstracts of Japan, vol. 16, No. 290 (M-1272) (4-78675) Jun.-1992.
Patent Abstracts of Japan, vol. 16, No. 325 (M-1280) (4-92788) Jul.-1992.
Patent Abstracts of Japana, vol. 16, No. 563 (M-1342) (4-218474) Dec.-1992.
Patent Abstracts of Japan, vol. 17, No. 83 (M-1369) (4-283181) Feb.-1993.
Patent Abstracts of Japan, vol. 17, No. 99 (M-1373) (4-292277) Feb.-1993.

*Primary Examiner*—Peter R. Brown
*Attorney, Agent, or Firm*—Evenson, McKeown, Edwards & Lenahan

[57] ABSTRACT

A divided seat for a motor vehicle, especially for a motorcycle, is described in which both seat parts are removable and mountable independently of one another. Mounting is accomplished by a central locking mechanism controlled by a central lock. With the seat part for the passenger removed, the part of the vehicle body located below is used as an elongated luggage rack or storage area. This storage area can be provided with a cover that closes a container located beneath for tools and the like. A separate locking block permits locking this cover when the seat part is removed, likewise using the central lock.

16 Claims, 1 Drawing Sheet

DIVIDED SEAT FOR A MOTOR VEHICLE

BACKGROUND AND SUMMARY OF THE INVENTION

The invention relates to a divided seat for a vehicle, especially for a motorcycle.

Divided seats for motorcycles are known. It is also known to assign additional functions to the part of the seat provided for the passenger. Thus, for example, U.S. Pat. No. 4,506,754 illustrates one possibility of using this part of the seat additionally as a backrest for the driver.

German Patent Document DE-OS 34 03 697 likewise shows a divided seat, to which a helmet can be fastened with protection against theft. The seat according to this prior publication likewise provides an additional function, namely serving as a container. For this purpose, the seat cushion itself is made in the form of a cover for this container.

An object of the invention is to simplify the adjustability and variability of a divided seat and to protect it in simple fashion against unauthorized removal.

This object is achieved according to the invention by providing an arrangement wherein a divided seat for a motor vehicle, especially a motorcycle, includes a first seat part for the driver and a second seat part for the passenger, said seat parts being made separate from one another and each seat part being mountable on and removable from the vehicle body, wherein each seat part is lockable individually by a central lock to the vehicle body.

According to the invention, the two seat parts for the driver and passenger can be removed separately from one another from the vehicle. On the other hand, they can be locked in simple fashion by a central lock to the body of the vehicle, regardless of whether one seat part has been removed or not. This offers the advantage that the vehicle can be converted to a single-seater or two-seater without additional tools.

In one advantageous embodiment, a locking hook is associated with each part of the seat, said hook being operable by the central lock. In a design with a height-adjustable seat part, a plurality of locking hooks is provided as needed for this seat part, depending on the selected position.

The locking hooks are operated by the central lock. It is advantageous in this regard to have the locking hooks of both seat parts operated simultaneously by a single turn of the lock. However, embodiments are also contemplated, wherein, with a first turn of the key, one can lock one of the seat parts and, with further rotation, can lock the other seat part.

Advantageously, the locking hooks, especially the locking hooks located remotely from the central lock, are controlled by a rod. However, electrical solutions are also contemplated in which the central lock merely closes electrical contacts. In this case, correspondingly controlled electrical positioning elements actuate the locking hooks.

According to the invention, as already described, each part of the seat can be removed individually and separately from the other. This offers the possibility of designing the parts of the vehicle body covered by the seat part used by the passenger as a storage area. In this manner, the driver, if he is riding alone and has removed the seat part for the passenger, has greater storage capability, for example, for his luggage.

In a preferred embodiment, this storage area forms a cover for a container located beneath. The tool kit or other materials can be stored in the container. When the seat part for the passenger is placed in position and locked, this cover and the tools are inaccessible. However, since the motorcycle according to the invention can also be driven with the seat part removed, it is desirable to make this cover lockable as well.

In one advantageous embodiment, therefore, the invention provides using the same central lock used for the seat part to lock this cover as well. This can be accomplished with a suitable design for the cover, for example, with an additional locking hook. In one advantageous design, a separate locking block is used for this purpose, said block being inserted into a receiving opening in the cover when the seat part is removed, said block, pointing downward in this position, also cooperating with the locking hook provided for this part of the seat.

In order to have the locking block always available, but to ensure that it is not lost, in another embodiment the invention provides two receiving openings in the cover of the storage compartment. The locking block is held in one receiving opening when the seat part is in place. It is inserted in the other receiving opening to lock the cover in the manner described above.

It is advantageous to insert the locking block in the receiving openings when the change is made. In other words, the portion that cooperates with the locking hook, normally an eye, in one case, i.e., in the non-locked states, points upward in the direction of the seat; in the other case, i.e., rotated through 180°, it points downward in the direction of the locking hook.

It is advantageous to make the outer circumference of the locking block opposite this locking section larger than the inside diameter of the receiving openings. In this manner, the locking block can be inserted from one side or the other into the corresponding receiving opening in the cover. Its enlarged outer contour then abuts the respective side of the cover.

Additional advantageous embodiments of the invention follow from the following description of an embodiment and the corresponding drawing.

Other objects, advantages and novel features of the present invention will become apparent from the following detailed description of the invention when considered in conjunction with the accompanying drawings.

DETAILED DESCRIPTION OF THE PREFERRED EMBODIMENTS

Figure 1:
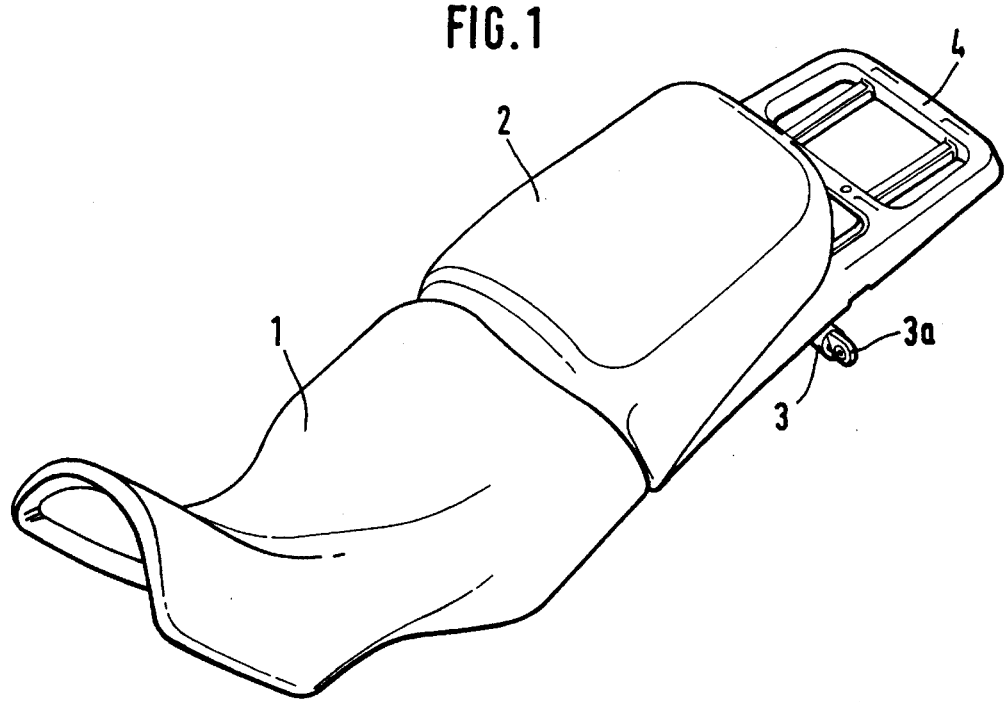
FIG. 1 is a schematic perspective view of a divided seat for a motorcycle constructed according to a preferred embodiment of the invention.

The seat shown in FIG. 1 consists of a front seat part 1 for the driver and a second, rear seat part 2 for the passenger. The two seat parts 1 and 2 are made separate from one another and each can be attached to and removed from the vehicle body independently. In this manner, the motorcycle can be operated as a two-seater or as a single-seater with seat part 2 removed. Both seat parts 1 and 2 are attached to the vehicle body by a locking mechanism described in greater detail below and actuated by a central lock 3 or a removable key 3a. For the sake of completeness, it should be mentioned at this juncture that seat part 1 partially surrounds a fuel tank of the motorcycle, not shown in greater detail, with its forward rising projection. At the rear end of the motorcycle, in other words in the vicinity of seat part 2, a baggage rack is also provided.

Figure 2:
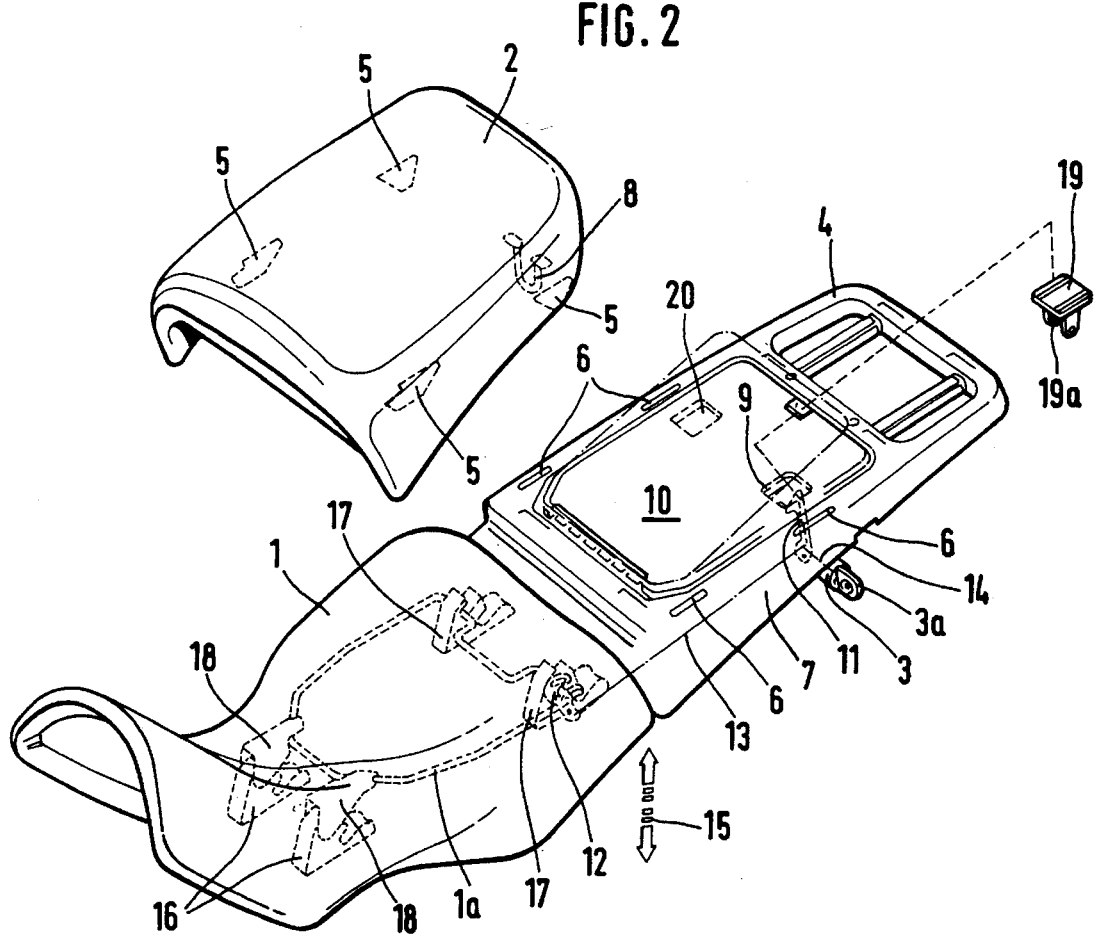
FIG. 2 is a schematic perspective partially exploded view which shows the seat according to FIG. 1 with locking mechanism and rear seat part removed.

The mechanism by which seat parts 1 and 2 are locked to the vehicle body can be seen in FIG. 2. In order to be able to identify the individual parts better, seat part 2 has been removed and shown in an exploded view relative to the other parts. With seat part 2 in place, tabs 5, located on the underside of seat part 2, engage in corresponding slots 6 in a frame 7 integral with the vehicle. Frame 7 is designed as an extension of luggage rack 4.

A locking eye 8, likewise fastened to the underside of seat part 2, with seat part 2 in place, passes through a receiving opening 9 in a cover 10 set into frame 7. Beneath the cover, a first locking hook 11 is pivotably mounted and operable by central lock 3. A dot-dashed line marked 14 is intended to symbolize the operating connection between key 3a and the locking hook. Locking hook 11 engages locking eye 8, thus locking seat part 2 to frame 7 to integrate it with the vehicle.

Seat part 1 can be adjusted heightwise, as indicated by the double arrow 15 in FIG. 2. For this purpose, ladder-like pillow blocks 16, 17 are mounted on the vehicle body. Each pillow block 16, 17 has two receiving slots provided one above the other defining the different height positions of the seat. A steel loop 1a fastened to the underside of seat part 1 can be inserted directly into the receiving slots of pillow blocks 17, while intermediate elements 18 engage the receiving slots of the front pillow blocks 16, said parts 18 in turn being connected permanently to steel loop 1a. This design of pillow blocks 16 and 17 allows front seat part 1 to be set at two different height positions.

In order to be able to lock seat part 1 in each of these positions, a locking hook 12 is designed as a double lock, with each partial lock being associated with an insertion slot. In the example shown, seat part 1 is in the upper position. Locking hook 12 can also be actuated by central lock 3. A rod is provided for this purpose, however, and is indicated in FIG. 2 generally by 13 as a dot-dashed line.

By virtue of the position of the pivot points of locking hooks 11 and 12 as well as the points of engagement of actuating mechanism 13, 14, both locking hooks 11 and 12 can be pivoted simultaneously into the respective desired position by a turn of the key. Advantageously, this is done against spring force in such manner that the springs pull locking hooks 11 and 12 into their closed positions. In this way, the seat parts can be mounted and locked without a key if the locking hooks have an appropriate design.

Turning key 3a pivots locking hooks 11 and 12 simultaneously via active connection 14 and rod 13.

When seat part 2 is removed as shown in FIG. 2, frame 7 and cover 10 serve as storage areas for luggage or the like. This gives the driver increased storage space together with luggage rack 4. To secure the material being transported, cover 10 can be provided with knobs, not shown, on the top to increase the frictional resistance.

Cover 10 seals a container located beneath it. This container, not shown in FIG. 2, is used to store the tool kit or other small parts. Cover 10 can be removed. In order to show this in FIG. 2, the cover is shown in a half-open state by the dot-dashed lines.

With seat part 1 mounted and locked, access to cover 10 and the objects in the container is likewise blocked. With seat part 2 removed, as shown in FIG. 2, cover 10 is likewise locked by central lock 3. For this purpose, a separate locking block 19 is provided that can be inserted into receiving opening 9. Locking block 19 has in its lower portion an eye 19a comparable to locking eye 8, which locking hook 11 can engage. The outer contour of locking block 19 is so dimensioned on the side facing away from eye 19a that it is larger than the inside diameter of receiving opening 9. As a result, when it is mounted, it rests on the marginal area of receiving opening 9, on top of the cover. As soon as locking hook 11 engages, it is pulled against cover 10, thus locking cover 10 and maintaining its position.

An additional receiving opening 20 can be provided in cover 10. It is drawn in dotted lines. Receiving opening 20 corresponds in its dimensions to receiving opening 9. It serves to receive locking block 9 when seat part 2 is installed. Locking block 19 is inserted from below into receiving opening 20, so that eye 19a points upward toward the underside of the seat. In this case, it is advantageous to provide a corresponding counterbearing, integral with the frame, on the underside of the cover or locking block 19. This prevents the locking block from rattling during travel.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. Divided seat mounted on a motorcycle having a vehicle body, comprising:
    a first seat part for a driver and a second seat part for a passenger, said first and second seat parts being made separate from one another and each seat part being mountable on and removable from the vehicle body; and
    a central lock mounted on the motorcycle for operating a separate lock for each seat part to individually lock each of said first and second seat parts to the vehicle body.

2. Seat according to claim 1, further comprising at least one locking hook engaging with each seat part for locking each seat part on the vehicle body, said hooks being actuatable by the central lock.

3. Seat according to claim 2, wherein the central lock includes means for simultaneously actuating the locking hooks.

4. Seat according to claim 3, further comprising a rod coupled with the at least one locking hook and the central lock for actuating the at least one locking hook by the central lock.

5. Seat according to claim 4, further comprising a storage area in the vehicle body, wherein the second seat part is a passenger-seat part which covers said storage area when in an in-use position on the motorcycle.

6. Seat according to claim 2, further comprising a rod coupled with the at least one locking hook the central lock for actuating the at least one locking hook by the central lock.

7. Seat according to claim 1, further comprising a storage area in the vehicle body, wherein the second seat part is a passenger-seat part which covers said storage area when in an in-use position on the motorcycle.

8. Seat according to claim 7, wherein the storage area comprises a container located beneath the passenger seat part in the in-use position, and a cover for closing said container.

9. Seat according to claim 6, further comprising means for unlocking the cover by the central lock.

10. Seat according to claim 7, wherein the cover provides at least one receiving opening for a separate locking block.

11. Seat according to claim 10, wherein the cover has two receiving openings for the locking block, said locking block being held in a first receiving opening with the seat part locked such that the locking block is not engaged with the cooperating locking hook, and held in a second receiving opening when the seat part is removed, such that said locking block cooperates with the locking hook of the central lock associated with this part of the seat to lock the cover in place on the container.

12. Seat according to claim 11, wherein the locking block is insertable in the two receiving openings in such manner that it points upward in the direction of the passenger seat part in the first receiving opening when the passenger seat part is mounted on the vehicle body and projects downward in the direction of the locking hook in the second receiving opening when the passenger seat part is removed from the vehicle body.

13. Seat according to claim 12, wherein the locking block has an outer contour on a side located opposite the locking eye whose dimensions are larger than an inside diameter of the receiving openings.

14. Seat according to claim 14, further comprising a height adjustment mechanism for at least the first seat part for the driver.

15. Seat according to claim 10, wherein the locking block has an outer contour on a side located opposite the locking eye whose dimensions are larger than an inside diameter of the receiving openings.

16. Seat according to claim 1, further comprising a height adjustment mechanism for at least the first seat part for the driver.

* * * * *